United States Patent [19]

Gutman

[11] Patent Number: 5,646,976
[45] Date of Patent: Jul. 8, 1997

[54] OPTICAL ELEMENT OF MULTILAYERED THIN FILM FOR X-RAYS AND NEUTRONS

[75] Inventor: George Gutman, Birmingham, Mich.

[73] Assignee: Osmic, Inc., Troy, Mich.

[21] Appl. No.: 487,936

[22] Filed: Jun. 7, 1995

Related U.S. Application Data

[63] Continuation-in-part of Ser. No. 283,610, Aug. 1, 1994, abandoned.

[51] Int. Cl.$^6$ .................................................. G21K 1/06
[52] U.S. Cl. .................................................. 378/84; 378/82
[58] Field of Search .................................... 378/84, 85, 82

[56] References Cited

U.S. PATENT DOCUMENTS

| | | | |
|---|---|---|---|
| 4,525,853 | 7/1985 | Keem et al. | 378/83 |
| 4,698,833 | 10/1987 | Keem et al. | |
| 5,163,078 | 11/1992 | Iketaki | 378/85 |

OTHER PUBLICATIONS

"A Unified Geometric Insight for the Design of Toroidal Reflectors with Multilayered Optical Coatings: Figured X-ray Optics" Proceedings of the International Society of Optical Engineering, vol. 562, Aug. 20–22, 1985 by Gerald Marshall, pp. 114–134.

"A New Method for Achieving Accurate Thickness Control for Uniform and Graded Multilayer Coatings on Large Flat Substrates" in Proceedings of International Society of Optical Engineering, vol. 1742, Jul. 1992, by G. Gutman, J. Keem, K. Parker, J.L. Wood, pp. 373–380.

"Layered Synthetic Microstructures as Optical Elements for the Extreme Ultraviolet and Soft X–Rays", International Journal of Modern Physics B, vol.5, No. 13 (1991) by Chakraborty pp. 2133–2228 no month.

"Monochromatization by multilayered optics on a cylindrical reflector and on an ellipsoidal focusing ring", in Optical Engineering, vol. 25, Aug. 1986, by Gerald F. Marshall, pp. 922–932.

*Primary Examiner*—Craig E. Church
*Attorney, Agent, or Firm*—Harness, Dickey & Pierce P.L.C.

[57] ABSTRACT

This invention relates to novel methods of producing flat and curved optical elements with laterally and depth graded multilayer thin films, in particular multilayers of extremely high precision, for use with soft and hard x-rays and neutrons and the optical elements achieved by these methods. In order to improve the performance of an optical element, errors in d spacing and curvature are isolated and subsequently compensated.

8 Claims, 4 Drawing Sheets

| PIECE NUMBER | 1 | | | | | | |
|---|---|---|---|---|---|---|---|
| DISTANCE FROM CENTER (IN mm) | -24 | -16 | -8 | 0 | 8 | 16 | 24 |
| ANGULAR DEVIATION FROM CALCULATED CURVE (IN ARCMIN) | -2.6 | 0.0 | -0.1 | 0.0 | -0.4 | -0.1 | -0.8 |
| PIECE NUMBER | 2 | | | | | | |
| DISTANCE FROM CENTER (IN mm) | -24 | -16 | -8 | 0 | 8 | 16 | 24 |
| ANGULAR DEVIATION FROM CALCULATED CURVE (IN ARCMIN) | -0.4 | -0.4 | 0.0 | 0.0 | 0.3 | 0.7 | 0.1 |

OPTICAL ELEMENT OF MULTILAYERED THIN FILM FOR X-RAYS AND NEUTRONS

CROSS REFERENCE TO RELATED APPLICATIONS

This application is a continuation-in-part of U.S. application Ser. No.: 08/283,610, Filed Aug. 1, 1994, now abandoned.

BACKGROUND AND SUMMARY OF THE INVENTION

This invention relates to novel methods of producing flat and curved optical elements, in particular elements of extremely high precision, using multilayer thin films for use with soft and hard x-rays, cold and thermal neutrons, and the optical elements achieved by these methods.

Thin film technology has been widely used to control the reflection and transmission of visible light. However, in the wavelength range of x-rays and neutrons the use of thin films has only recently become practicable. X-ray and neutron optics has presented many challenges to scientists including the inability to reflect at near-normal incidence, poor quality of paraboloid or hyperboloid optical elements used for grazing reflection and lack of sources. Recent advances in the quality control of Layered Synthetic Microstructures (LSM), or multilayers, allows the use of these structures as x-ray and neutron mirrors.

X-ray diffraction from multilayer mirrors is analogous to x-ray diffraction from perfect crystals where the lattice planes are located in the nodes of the standing wave produced by the superposition of incident and reflected (diffracted) waves for enhanced diffraction efficiency. Multilayer mirrors can be considered as an extension of natural crystals for larger lattice spacings. Therefore, as for crystals, x-ray photons will be reflected from multilayer structures only if the Bragg equation is met:

$$n\lambda = 2d \sin(\theta)$$

where $\lambda$=wavelength of the incident radiation d=layer-set spacing of a Bragg structure, or the lattice spacing of a crystal $\theta$=angle of incidence n=the order of the reflection The structure of a crystalline solid, a regular three dimensional array of atoms, forms a natural diffraction grating for x-rays. The quantity d in the Bragg equation is the perpendicular distance between the planes of atoms in the crystal. The construction of an artificial diffraction grating with a spacing on the order of the x-ray wavelength was impossible at the time W. L. Bragg derived his foundational equation. However, crystalline structure can now be imitated by thin film multilayers, so x-ray diffraction is no longer limited to structures with naturally occurring d spacings.

In order for a multilayer structure to reflect by imitating a crystal structure, a light element of the lowest possible electron density is layered with a heavy element of the highest possible electron density. The heavy element layer acts like the planes of atoms in a crystal, as a scatterer, while the light element layer behaves like the spacers between the planes of atoms. A further requirement of these two elements is that they do not interdiffuse.

Multilayers possess advantages over natural crystalline structures because by choosing the d spacing of a multilayer structure, devices may be fabricated for use with any wavelength and incidence angle. Crystals also possess poor mechanical qualities such as resistance to scratching.

X-ray optics has benefitted greatly from three variations on a multilayered optical element: multilayers on figured or curved optical elements, depth graded multilayers and laterally graded multilayers.

By varying the d spacing laterally across the surface of a figured optic, x-rays of the same wavelength can be reflected from every point on the surface, even where the angle of incidence changes across the surface. At each point, the angle of incidence and the d spacing is manipulated according to the Bragg equation. Depth grading is used as a means for broadening of the band pass, therefore increasing the integrated reflectivity of a particular multilayer structure.

Two sources of error will profoundly affect the performance of an x-ray optical element. First, the curvature of the element is difficult to produce exactly and will be subject to a tolerance range. Second, although great improvements have recently been made in techniques for quality control of evaporated and sputtered films, imperfections in d spacing will always exist.

Errors in the surface curvature of the element will partly destroy the image. The reflectivity of the element will also decrease because the angle of incidence will be different than that calculated. The d spacing error will also result in decreased reflectivity.

Accuracy to a fairly low tolerance is required from both the d and $\theta$ input in the Bragg equation. However, errors in d spacing are difficult to distinguish from errors in curvature in the final products. The result is that numerous elements will probably be discarded before an acceptable optical element is produced. Without the ability to determine whether the error lies in the shaping or deposition processes, the production process cannot be corrected.

The current invention is comprised of a figured optical element and unique methods used to produce a multilayer structure on this element. The optical element consists of a curved substrate upon which a plurality of layer sets are produced. In the production of this element, the causes of imperfections can be isolated and the d spacing and/or angle of incidence can be adjusted to compensate. The result is unprecedented performance of an x-ray optical element.

One method involves characterizing the surface of the optical element before multilayers are deposited onto it. Calculations are then performed so that the layer d spacing will compensate for errors in the curvature. As a result, the reflectivity of the surface will be preserved.

In an alternate method, a flat optical element will be coated with thin multilayers whose spacing has been calculated to achieve the desired effect on a beam of x-rays for an element with a known curvature. Then the deviation of the actual d spacing from the calculated multilayers will be found. Using this information, an adjusted curvature for an element can be calculated to compensate for the error in d spacing.

An additional advantage of this invention is its application to x-rays in the soft x-ray (about 10 to 200 angstroms) and the hard x-ray range (about one one-thousandth of an angstrom to 10 angstroms). Previously disclosed elements have been limited to use with soft x-rays and extreme ultraviolet rays. The appreciably shorter wavelength of hard x-rays demands previously unattainable accuracy in optical elements.

Proposed applications of such optical elements include spectroscopy and diffractometry, in particular, a diffractometer using a parabolic multilayer mirror with lateral grading d spacing which reflects a parallel beam of defined wavelength. Optical elements would also be applied to focusing optics, for x-ray lithography and microscopy, in particular, optics for high resolution scanning x-ray microscopy, point to point imaging optics including multi-element systems, an optic for monochromatization of broadband radiation, synchrotron radiation in particular. Many medical applications are also contemplated, in particular, as power filters to eliminate undesired energy or use in radiography where a high contrast image is desired.

These optical elements can also be used for transformation beams of cold and thermal neutrons. In particular, they can be used for increasing density and uniformity of neutron flux or separation of the neutrons with different spin.

Additional objects and advantages of the invention will become apparent from the following description and the appended claims when considered in conjunction with the accompanying drawings.

DETAILED DESCRIPTION OF THE PREFERRED EMBODIMENT

Figure 1:
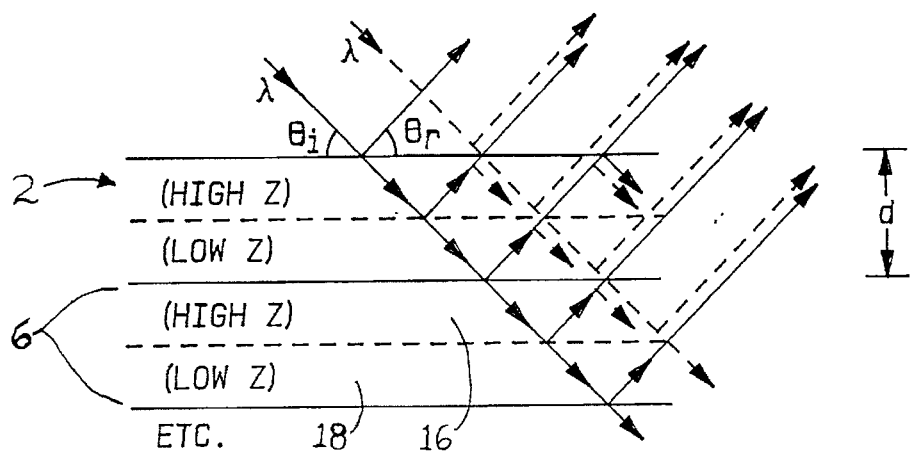
FIG. 1 is an exploded cross-sectional view of a multilayer structure with uniform layer thicknesses on a substrate.
Figure 2:
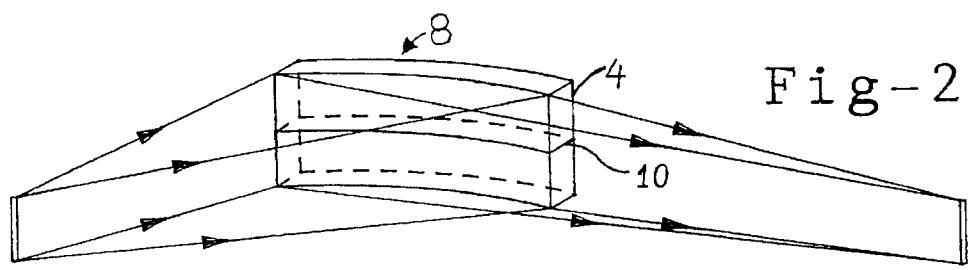
FIG. 2 illustrates how an optical element, curved in the shape of a section of an elliptical cylinder, which is coated with lateral and depth graded multilayers, performs line to line imaging.

With reference to the accompanying drawings, the optical element 2 of this invention is shown generally in FIG. 2 and in cross-section in FIG. 1 as comprising a substrate 4 coated with a plurality of layer sets. Each layer set 6 is made up of two separate layers of differant materials: one with relatively high atomic number, or Z, and a second with relatively low atomic number.

FIG. 1 is a cross-sectional view of a multilayer structure, of thickness d, deposited on a substrate, where x-rays of wavelength $\lambda$ encounter the multilayer structure with an angle of incidence $\theta$. The multilayers in FIG. 1 are uniform, meaning that the d spacing does not vary either lateally or through the depth of the multilayer structure.

One embodiment of an improved optical element with multilayers performing line to line imaging is illustrated in FIG. 2. The optical element 8 pictured in FIG. 2 is shaped as a section of an elliptical cylinder and has laterally and depth graded multilayers, designed to format a known shape source to an identically shaped image.

Figure 3:
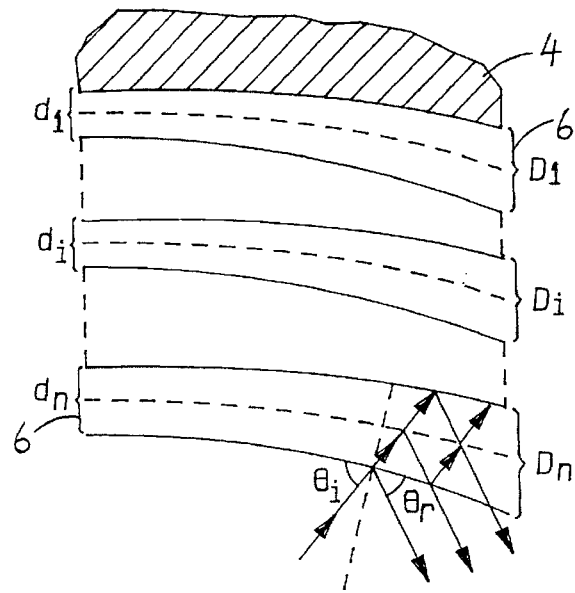
FIG. 3 is an exploded cross-sectional view of multilayer structure on a substrate shown in FIG. 2, where the layer thicknesses vary laterally and by depth.

A cross-sectional view of the optical element 11 is shown in FIG. 3, where the cross-section is taken along plane 10 of FIG. 2. The layer sets 6 of this optical element 8 are graded lateally and by depth. Lateral grading means that the d spacing varies across the surface of the structure. Therefore in FIG. 3:

$$d_i \langle D_i$$

where i is the order of the layer set and i varies from 1 to n. The multilayer of FIG. 3 is also depth graded, so the d spacing varies from layer to layer. In FIG. 3: where i is the order of the layer set and i varies from 1 to n.

The layer set thicknesses, or d spacings, of the multilayers $$d_i \langle d_{i+1}$$

$$d_i \langle D_{i+1}$$

are on the order of one to a few wavelengths of the desired source. From about 10 to 1000 thin film layers may be deposited on a substrate, depending on the desire qualities of the multilayer structure. The layer sets must be composed of two materials with diverse electron densities. The high electron density layer 16 behaves like the plane of atoms in a crystal, while the low electron density layer 18 is analogous to the space between the planes. In the preferred embodiment of this invention, the heavy element, with a high electron density, is tungsten. The preferred choice for the light element, with low electron density, is silicon.

The substrate 4 upon which the multilayers are produced must meet precise specifications. The surface of substrate 4 must be capable of being polished to roughness which is precise on an atomic level. The root mean squared surface roughness of the substrate of the preferred embodiment will range from 0.5 to 20 angstroms, measured at intervals of about 10 angstroms. Examples of material used for substrates are silicon wafers, mica, quartz, zeradot, sapphire, germanium, pyrex, silicon carbide or other like substances. In the preferred embodiment of this invention, the substrate is a silicon <100> wafer. A <100>-oriented silicon crystal exposes a smaller number of incomplete interatomic bonds at the crystal surface than a <111>-oriented crystal.

Figures 4, 5A:
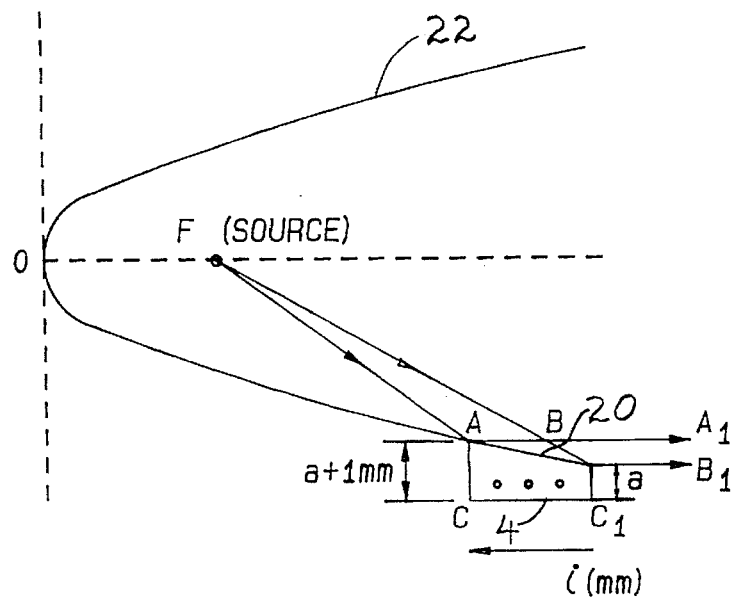
FIG. 4 illustrates how the curvature of the preferred optical element is in the shape of a section of a parabolic cylinder.
FIG. 5a is a chart showing the accuracy of the curvature produced in two parabolic mirrors.

The curvature of the substrate 4 may take the form of a section of an elliptical cylinder, a parabolic cylinder or an aspherical surface. FIG. 4 illustrates how the surface 20 of a cross-section of a substrate mimics the curvature of a section of a parabola 22. This surface 20 is designed to format the incident x-rays into a collimated beam of x-rays.

For the most precise applications, the substrate is ground to the proper curvature and then polished on an atomic level. Alternatively, the substrate is attached to a rigid curved metallic piece by a layer of adhesive. When adhesive is used, the substrate is an extremely thin, elastically bendable substance. The adhesive used, preferably some form of an epoxy, must not expand or contract within a very precise tolerance range. The adhesive may also serve the purpose of leveling off the optical element by filling in any uneven areas.

Figure 6:
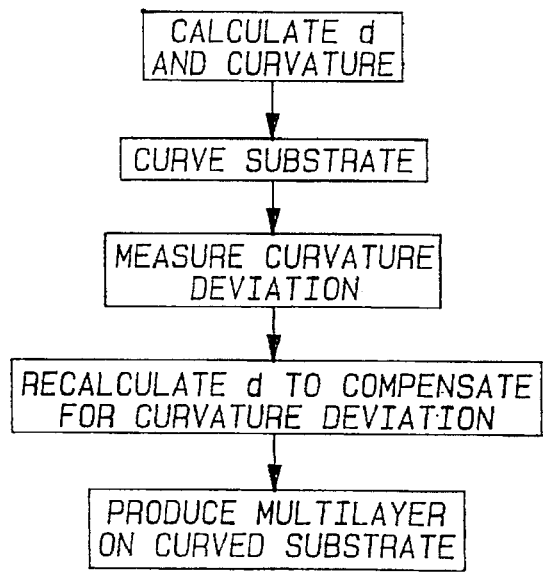
FIG. 6 illustrates the steps followed in a first method of the invention.

The steps of a first method of this invention, diagrammed in FIG. 6, isolate the error in the curvature of the surface before multilayers are deposited, and then compensate for the error by adjusting the layer d spacing. First, a workable d spacing scheme and optical element curvature for the desired wavelength and contemplated use is calculated by using the Bragg equation. Next, the substrate is ground to the calculated curvature and polished on an atomic level. The deviation of the actual curvature from the calculated curvature is then measured using known techniques. The Bragg equation is again utilized to calculate new d spacings for the multilayers which will compensate for the error in the actual curvature. Finally, multilayers on the curved substrate are produced with the compensating d spacing.

Figure 7:
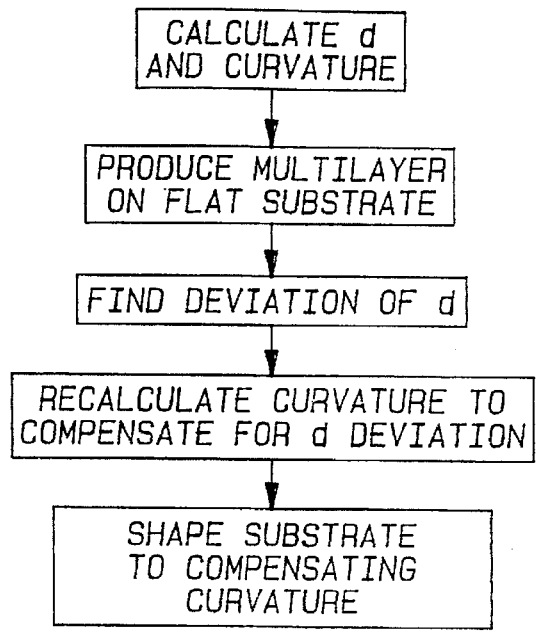
FIG. 7 illustrates the steps followed in a second method of the invention.

A second alternate process is diagrammed in FIG. 7. First the required d spacings and curvature are calculated using the Bragg equation. Then a flat optical element is coated with thin multilayers whose spacing has been calculated to achieve the desired effect on a beam of x-rays for an element with the calculated curvature. Next, the deviation of the actual d spacing from the calculated d spacing will be found. Using this information, the Bragg equation is used to calculate an adjusted curvature for the element which compensates for the deviation of the d spacing. The coated substrate is then shaped to the compensating curvature.

Alternatively, in the second method an optical element can be produced with the desired curvature and coating instead of coating a flat element. This curved coated element may then be flattened in order to characterized the d spacing of the layers. Although layers on a curved optical element can be characterized without flattening, flattening the element is the simplest method.

Figure 8:
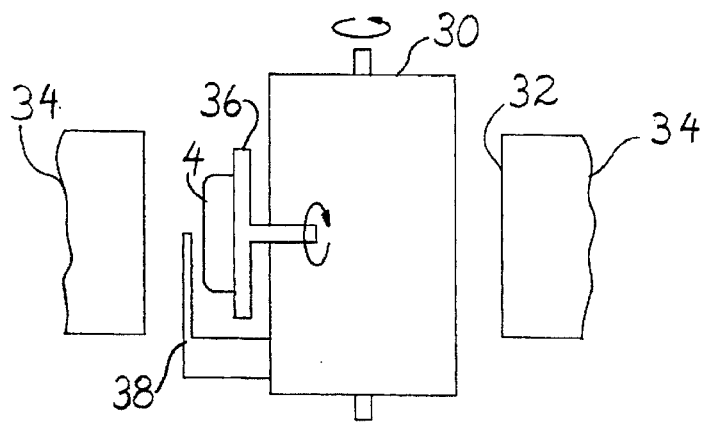
FIG. 8 illustrates the preferred magnetron sputter deposition assembly.

Many different techniques can be used to produce the multilayers on the substrate, including magnetron sputtering, electron-beam deposition, and laser evaporation. A rotating drum type magnetron sputtering system 28 is shown at FIG. 8. The substrate 4 is placed on a rotating drum 30. A coating material 32, attached to a cathode 34, is bombarded by particles. Atomic particles are then dislodged from the coating material 32 and are intercepted by the substrate 4. One of two coating materials 32 is placed on each cathode 34, where the cathodes are located about 160° apart. The drum 30 rotates with an angular velocity, exposing the substrate 4 to a coating material 32 as it passes each cathode 34. One layer set is deposited in one rotation.

The substrate 4 is mounted on a spinning platform 36 which is in turn mounted on the rotating drum 30. The platform 36 spins, with a known angular velocity, on an axis perpendicular to the axis of the drum 30.

Lateral grading of the multilayer is accomplished by mounting a mask between the cathode 34 and the substrate 4. The mask 38 is precisely shaped to accomplish the desired laterally graded layer as the substrate 4 rotates. Depth grading is achieved by varying the angular velocity of the rotating drum 30, thereby varying the amount of coating material 32 which will fall upon the substrate 4 in each rotation.

Figure 9:
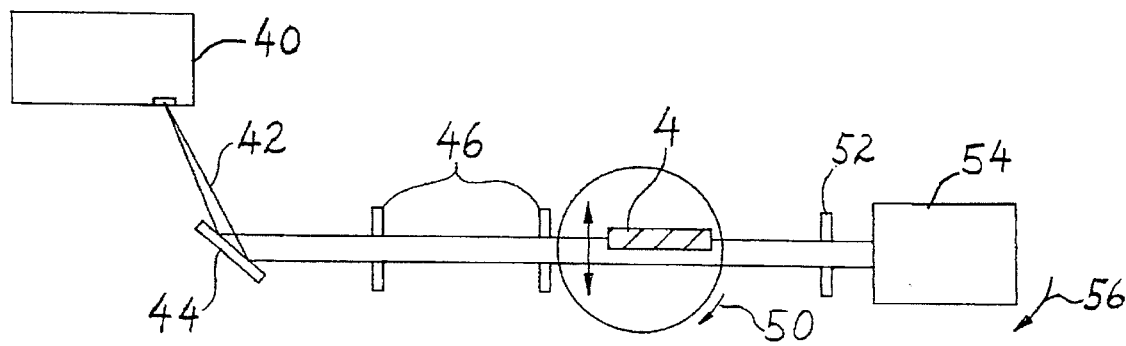
FIG. 9 illustrates a Huber diffractometer used to measure the d spacing of multilayers on a flat optical element.

The d spacings of layers on a flat optical element are characterized using the Huber diffractometer illustrated in FIG. 9. This instrument can precisely characterize the multilayer structure in a very small area. Numerous measurements are necessary to examine the entire multilayer structure. The radiation coming from the x-ray tube 40 is a beam of Copper K-α radiation 42, which is reflected off a Germanium <111> monochromator 44. The collimation of the beam is determined by adjusting two collimating slits 46 in the primary beam path. The substrate 4 is translated across the x-ray beam 42 in the direction normal to the optical axis of the apparatus. The substrate 4 is also rotated in the direction of arrow 50. After being diffracted by the multilayers, the beam passes through a receiving slit 52 and into a detector 54 which measures the intensity of the radiation received. As the substrate is rotated through an angle φ along arrow 50, the detector is rotated through twice the angle, 2φ, in the direction of arrow 56. The aggregate instrumental error of the diffractometer used is less than 0.1%.

Figure 5B:
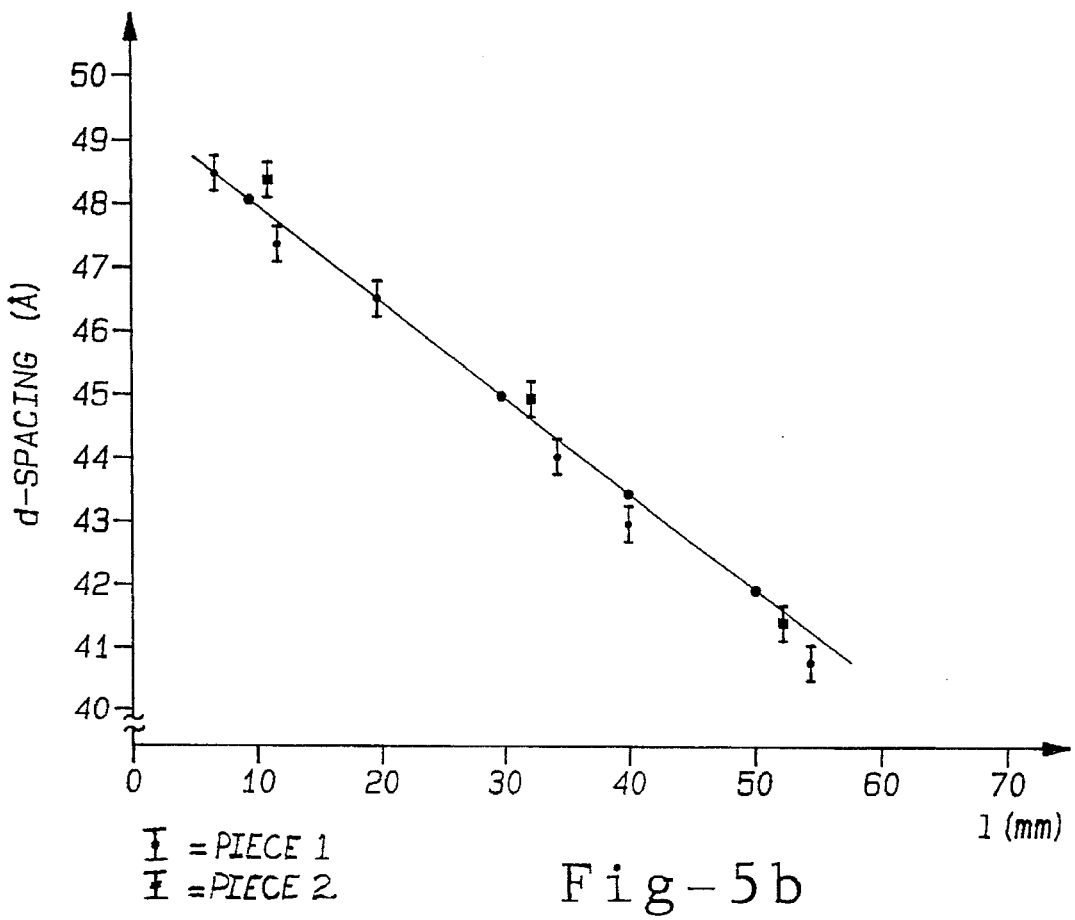
FIG. 5b is a graph showing the accuracy of d spacing produced in two parabolic mirrors.

Both of the above described methods are iterative processes, which can be repeated and used in combination until the required performance level of the optical element is achieved. FIG. 5a shows the accuracy, in arcminutes, achieved for the curvature of two multilayer mirrors which were tested. These multilayer mirrors, piece 1 and piece 2, were curved in the shape of a parabolic cylinder. FIG. 5b is a graph which shows the accuracy of the layer set d spacings on the same two multilayer mirrors. The straight line on the graph shows the desired theoretical d spacings in angstroms plotted against the length position on the multilayer structure in millimeters.

While the above description constitutes the preferred embodiments of the present invention, it will be appreciated that the invention is susceptible of modification, variation and change without departing from the proper scope and fair meaning of the accompanying claims.

What is claimed:

1. A method for producing a figured optical element with multilayers in order to diffract x-rays comprising the steps of:
   a. theoretically calculating workable d space gradings of multilayer coatings and substrate curvature for contemplated use by using the Bragg equation;
   b. shaping the substrate to the calculated curvature;
   c. measuring the deviation of the substrate curvature from the calculated curvature;
   d. using the Bragg equation to calculate new d spacings for the multilayers which would compensate for the error in the substrate curvature; and
   e. producing multilayers on the curved substrate with the compensating d spacing.

2. The method of claim 1 where the multilayers are produced on the curved substrate using magnetron sputtering deposition.

3. The method of claim 1 wherein said substrate is shaped by being ground to said known curvature and then polished.

4. The method of claim 1 where said substrate is a thin flexible layer which is shaped by being adhered to a rigid piece having said known curvature.

5. A method for producing a figured optical element comprising a substrate with multilayer coatings in order to diffract x-rays comprising the steps of:
   a. theoretically calculating the workable d space gradings of multilayer coatings and substrate curvature for contemplated use by using the Bragg equation;
   b. producing multilayer coatings with the calculated d spacings on a flat substrate;
   c. measuring the deviation of the d spacings of the multilayer coatings on the flat substrate from the calculated d spacings;
   d. calculating a new curvature for the substrate using the Bragg equation which will compensate for the deviation of the actual d spacing from the calculated d spacing;
   e. shaping the substrate with the compensating curvature so as to improve the performance of the optical element.

6. The method of claim 5 where said substrate is shaped by being ground to said known curvature and then polished.

7. The method of claim 5 where said substrate is thin flexible layer which is shaped by being adhered to a rigid piece having said known curvature.

8. The method of claim 5 where the multilayers are produced on the curved substrate using magnetron sputtering deposition.

* * * * *